Dec. 19, 1933.  G. A. ENGLUND  1,940,405
CHUCK
Filed Sept. 4, 1931
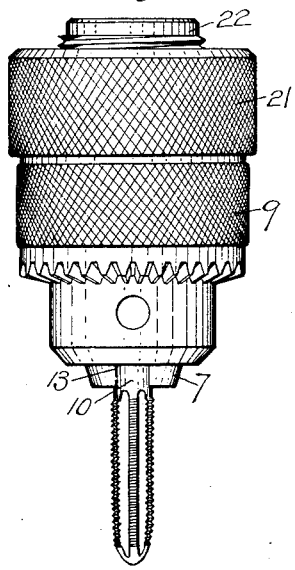
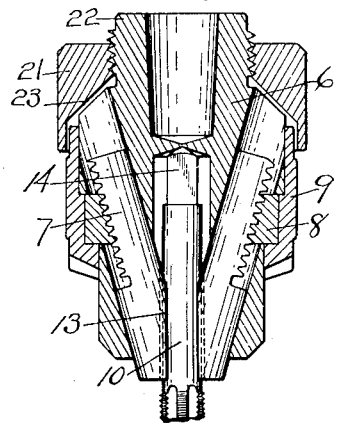
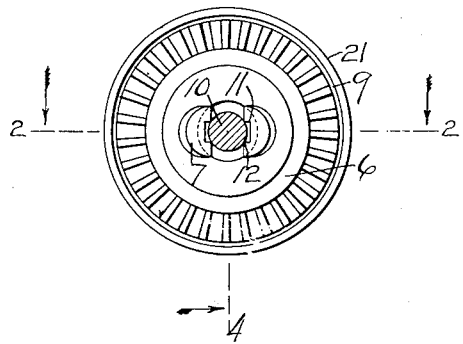
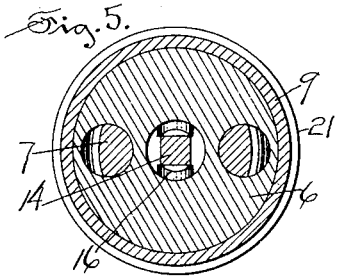
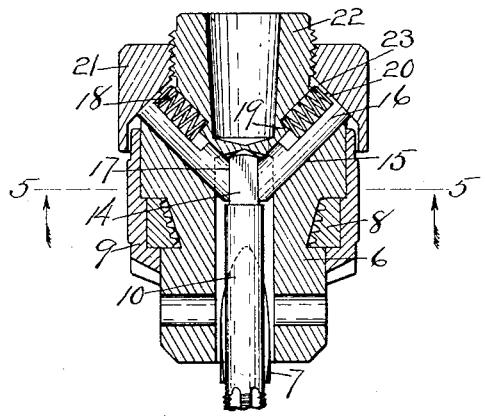
INVENTOR
Gustaf A. Englund.
by
Arthur P. Jenkins
ATTORNEY Patented Dec. 19, 1933

1,940,405

UNITED STATES PATENT OFFICE 1,940,405

CHUCK

Gustaf A. Englund, West Hartford, Conn., assignor to The Jacobs Manufacturing Company, Hartford, Conn., a corporation of Connecticut Application September 4, 1931. Serial No. 561,151

7 Claims. (Cl. 279—61)

My invention relates to that class of chucks more especially designed for holding drills, taps, and similar tools, and an object of my invention, among others, is the provision of a chuck of this type in which tool shanks of various shapes may be placed and securely held.

One form of a chuck embodying my invention and in the construction and use of which the objects herein set out, as well as others, may be attained is illustrated in the accompanying drawing, in which—

Figure 1 is a side view of a chuck embodying my invention.

Figure 2 is a view in section on a plane denoted by the dotted line 2—2 of Figure 3.

Figure 3 is a bottom end view of the chuck showing a tool cut in section.

Figure 4 is a view in section on a plane denoted by the dotted line 4—4 of Figure 3.

Figure 5 is a view in section on a plane denoted by the dotted line 5—5 of Figure 4.

In the accompanying drawing the numeral 6 denotes the body of my improved chuck having the usual tapered opening for the reception of a spindle to which the chuck is to be attached, said body also having a recess to receive a drill shank with obliquely arranged openings therefrom in which chuck jaws 7 are located, said jaws being threaded to fit the thread of a jaw operating ring 8 secured to a jaw operating sleeve 9 rotatably mounted on the body in a manner common to chucks of this type, rotation of the sleeve imparting longitudinal movement to the chuck jaws for the purpose of grasping or releasing a shank 10 of a cutting tool, this tool being a tap as illustrated herein.

It is common to form the shanks of drills and similar tools round in cross section, the ends of the jaws 7 being round in shape in cross section. In order to increase the grip of the jaws upon such a tool shank I have formed a groove 11 of rectangular shape thereby providing teeth 12 on opposite sides of the mouth of each groove and extending lengthwise of the shank engaging side 13 of each jaw. This provides biting edges or corners that will effectually prevent turning movement of the tool within the jaws.

Taps in a common form of construction have their ends 14 of rectangular or non-circular form to be received within an opening of like shape in a bar, which bar is used for manual operation of the tap in drilling a hole. My present invention contemplates the use of this angularly shaped end of the tap as an aid in holding the tap within the chuck.

In effecting this purpose holes 15 are diagonally formed through the body on opposite sides thereof, and auxiliary jaws 16 are placed in these holes, the ends of the jaws being obliquely formed as at 17 to fit the rectangularly shaped end 14 of the tap. Each of these jaws is cut away on one side to form recesses in which springs 18 are placed, which springs thrust at their inner ends against shoulders 19 in the holes 15 in the chuck body and at their opposite ends against lips 20 formed on the jaws, and as clearly shown in Figure 4 of the drawing.

An auxiliary clamping sleeve 21 is screw threadedly engaged with the end 22 of the chuck body, this sleeve having a recess in its under side with a tapered wall 23 that engages the ends of the auxiliary jaws, and as the sleeve is turned on its thread to move it in one direction along the chuck body the jaws 16 will be forced tightly into engagement with the rectangularly shaped end 14 of the tap. Upon turning said sleeve to move it in the opposite direction the springs 18 will release the auxiliary jaws from the end of the tap.

In this structure the jaws 7 will operate in the usual manner to grip and hold the round portion 10 of the tool shank.

In accordance with the provisions of the patent statutes I have described the principles of operation of my invention, together with the device which I now consider to represent the best embodiment thereof; but I desire to have it undersood that the device shown is only illustrative and that the invention may be carried out by other means and applied to uses other than those above set out.

I claim:

1. A chuck including a body having therein a recess for a drill shank and a hole intersecting said recess, a set of chuck jaws for securing a tool shank from turning movement in said recess, a jaw located in said hole and movable longitudinally transversely of said shank to engage it, a clamp sleeve supported on said body, and means for causing said sleeve to engage across one end of said jaw and force the opposite extreme end thereof into contact with said tool shank.

2. A chuck including a body having therein a recess for a drill shank and a hole intersecting said recess, a set of chuck jaws for securing a tool shank from turning movement in said recess, a jaw located in said hole and movable longitudinally transversely of said shank to engage it, and a clamp sleeve screw threadedly mounted on said body to engage across one end of said jaw and force the opposite extreme end thereof into contact with said tool shank.

3. A chuck including a body having therein a recess for a drill shank and holes intersecting said recess on opposite sides thereof, a set of chuck jaws for securing a tool shank from turning movement in said recess, auxiliary jaws located in said holes for engagement of their extreme ends with said tool shank, and a clamp sleeve screw-threadedly mounted on said body to engage across one end of each of said jaws and thereby force the extreme opposite ends of said jaws into contact with said tool shank on opposite sides thereof.

4. A chuck including a body having a central recess therein, a set of chuck jaw openings obliquely arranged therein, a set of holes intersecting said central recess, chuck jaws located in the chuck jaw openings to engage the sides of a tool shank and hold a tool from turning movement, a jaw actuating sleeve for said chuck jaws, auxiliary jaws located in said holes and movable lengthwise therein, and an auxiliary jaw actuating sleeve screw-threadedly mounted on said body to engage across one end of each of said auxiliary jaws and thereby force the opposite extreme ends thereof into contact with the tool shank, said sleeve covering the openings for the chuck jaws in said body.

5. A chuck including a body having therein a recess for a drill shank and holes intersecting said recess on opposite sides thereof, a set of chuck jaws for securing a tool shank from turning movement in said recess, auxiliary jaws located in said holes and obliquely arranged and movable lengthwise for engagement of their extreme ends with said shank, and a clamp sleeve screw-threadedly mounted on said body and having a recess with a sloping bottom to engage across one end of each of said jaws and thereby force the opposite extreme ends of said jaws into contact with the tool shank.

6. A chuck including a body having a central recess therein with chuck jaw openings extending obliquely therefrom and holes intersecting said central recess, means for securing a tool shank from turning movement in said recess, auxiliary chuck jaws with squared outer ends located in said holes, and an auxiliary jaw actuating sleeve screw threadedly engaged with said body, said sleeve having a recess with a sloping bottom to engage the squared ends of said jaws.

7. A chuck including a body having a central recess therein with chuck jaw openings extending obliquely therefrom and holes intersecting said central recess, means in said openings for securing a tool shank from turning movement in said recess, auxiliary jaws with flat inner ends located in said holes to engage opposite squared sides of a tool shank, and an auxiliary jaw actuating sleeve screw-threadedly engaged with said body and engageable with said auxiliary jaws across the ends thereof to force them by lengthwise movement to engage across their opposite ends with said squared ends of said tool.

GUSTAF A. ENGLUND.